United States Patent [19]

Kazino

[11] Patent Number: 4,486,135
[45] Date of Patent: Dec. 4, 1984

[54] TAPPING SCREW

[75] Inventor: Hiroshi Kazino, Komaki, Japan

[73] Assignee: Kabushiki Kaisha Aoyama Seisakusho, Nagoya, Japan

[21] Appl. No.: 395,922

[22] Filed: Jul. 7, 1982

[30] Foreign Application Priority Data

Jul. 14, 1981 [JP] Japan .......................... 56-104122[U]

[51] Int. Cl.³ ............................................. F16B 25/00
[52] U.S. Cl. ................................... 411/387; 411/416; 411/417; 10/10 R; 10/152 T
[58] Field of Search ................ 411/386, 387, 416–421; 10/10 R, 152 T, 152 R

[56] References Cited

U.S. PATENT DOCUMENTS

| 3,370,501 | 2/1968 | Ansingh | 411/387 |
| 3,597,781 | 8/1971 | Eibes et al. | 10/10 R |
| 3,978,760 | 9/1976 | Muenchinger | 411/386 |
| 4,069,730 | 1/1978 | Gutshall | 411/386 |
| 4,235,149 | 11/1980 | Veldman | 411/417 |

Primary Examiner—Thomas J. Holko
Assistant Examiner—Neill Wilson
Attorney, Agent, or Firm—Birch, Stewart, Kolasch & Birch

[57] ABSTRACT

A tapping screw in which a shank includes a main shank portion having a substantially uniform diameter and a reduced diameter shank portion having a substantially rounded triangle shaped cross-section. Tapping is carried out by the apexes of the rounded triangle in the reduced diameter shank portion, and therefore, screwing torque is greatly reduced as well as the fastening force is greatly increased as compared with a conventional tapping screw.

3 Claims, 5 Drawing Figures

TAPPING SCREW

BACKGROUND OF THE INVENTION

1. Field of the Invention

This invention relates to an improvement in a tapping screw.

2. Description of the Background Art

In fixing a metal plate member to a base plate such as steel, a tapping screw having the construction such as shown in FIG. 5 has been conventionally used. The tapping screw has a shank portion 21 which is progressively reduced in its diameter towards its tip and is equipped with a threaded portion 23 having a rough pitch, as shown in FIG. 5. The principal problem of the tapping screw of this kind is that the fastening force between the member to be fixed and the base plate is insufficient because a contact area between the shank portion 21 and a female screw portion formed in the metallic base plate upon screwing is small.

SUMMARY AND OBJECTS OF THE INVENTION

It is, therefore, an object of the present invention to provide a tapping screw free from the abovementioned problem.

BRIEF DESCRIPTION OF THE DRAWINGS

The present invention will become more fully understood from the detailed description given hereinbelow and the accompanying drawings which are given by was of illustration only, and thus are not limitative of the present invention, and wherein.

DETAILED DESCRIPTION OF THE INVENTION

Figure 1:
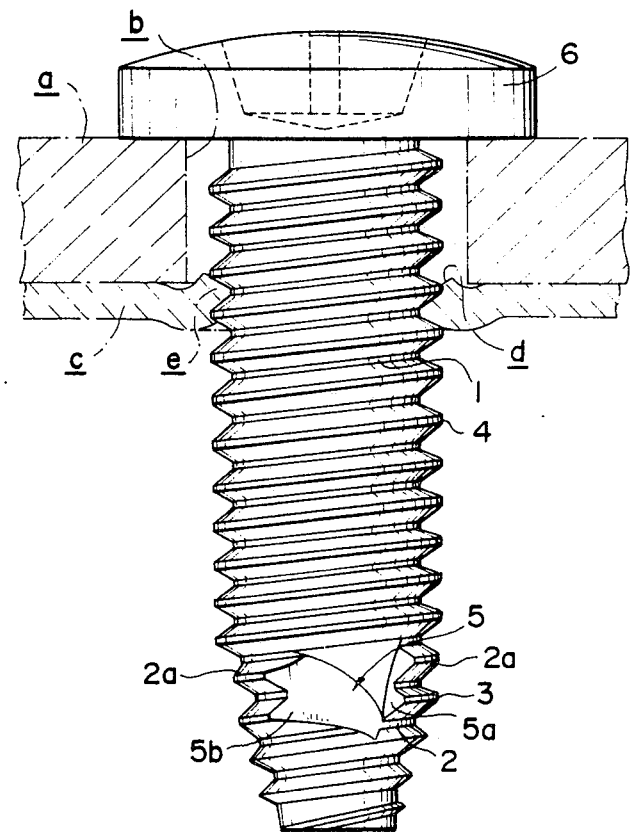
FIG. 1 is a front view showing a tapping screw of the present invention.
Figure 2:
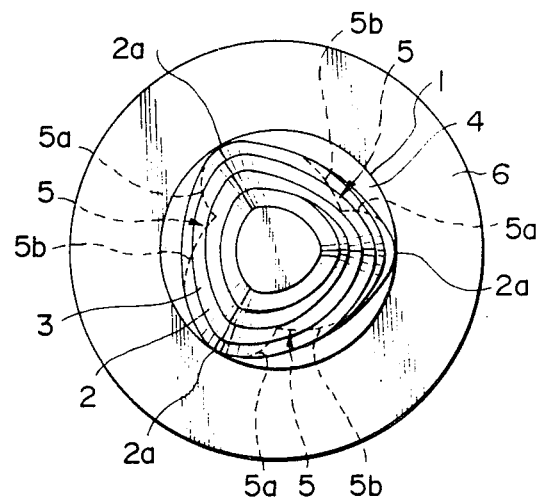
FIG. 2 is a bottom view of FIG. 1.

As illustrated in FIG. 1 shank portion 1 includes a base end portion having substantially the same diameter as that of the fore end portion. A shank portion 2 of reduced diameter includes a substantially rounded triangle shape in its cross-section which extends towards said fore end of the main shank portion 1. The term "rounded triangle" means a shape consisting of three curves of large radius of curvature forming three sides and three curves of small radius of curvature conjugated with said three side curves and forming three apexes. Threaded portions 3, 4 having the same pitch are formed on both the main shank portion 1 and the reduced diameter shank portion 2. Each small recess 5 is formed in the base end portions of the reduced diameter shank portion 2 in each region between the apexes 2a, 2a that correspond to the portions of the three curves having a small radius of curvature. Each small recess 5 forms a groove in which a face 5a in the screwing direction has a convex surface which is steeper than the face 5b on the opposite side. Preferably, these grooves are deviated with respect to the screwing direction between the apexes 2a, 2a. In this arrangement, since tapping is effected by the screw portion 3 extending from the face 5a in the screwing direction to the apex 2a, the area contacting with the base plate is especially reduced and it can be screwed with less torque.

When the tapping screw having the abovementioned construction, in which the reduced diameter shank portion 2 is continuous with the main shank portion 1, is used in the same way as the conventional tapping screw of this kind, the tip portion of the reduced diameter shank portion 2 serves as a guide when the screw is fitted into a hole d of the base plate c through a hole b of the member a to be fixed, thus the screw can be easily fitted. When screwing operation is effected in an ordinary manner by turning the head 6 after the screw has been fitted, screw portions 3 of the three apexes 2a cut the threads in the hole d because the reduced diameter shank portion has a substantially rounded triangle shaped cross-section. Accordingly, the screwing torque can be greatly reduced as compared with a conventional tapping screw. Since tapping is carried out by the apexes 2a, 2a of the reduced diameter shank portion 2, the diameter of the hole d is gradually expanded, and when the tapping position reaches the base of the reduced diameter shank portion 2, female threads corresponding to the threads 4 on the main shank portion 1 are formed in the hole d. The main shank portion 1 having a uniform diameter is then engaged with the female threads formed in the base plate by subsequent screwing, and therefore a rising portion e is formed by final fastening of the base plate c. The rising portion e provides a high fastening force, because the area of contact between this rising portion e and the main shank portion 1 becomes great.

Figure 3:
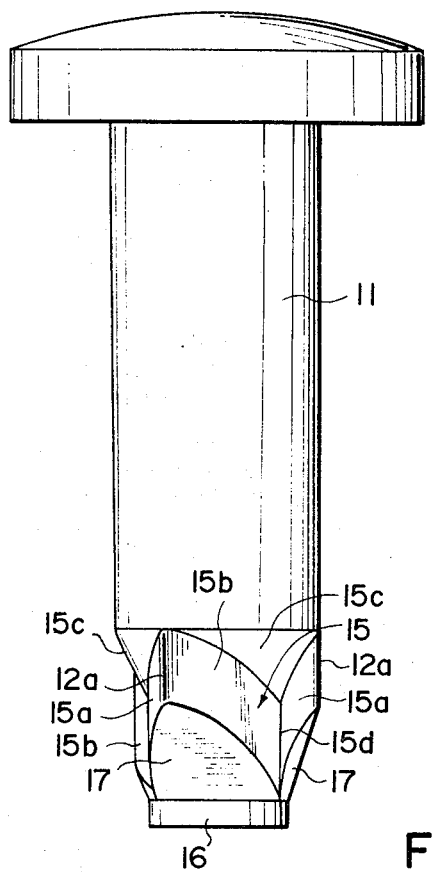
FIG. 3 is a front view of the screw blank for manufacturing the tapping screw of the present invention.
Figure 5:
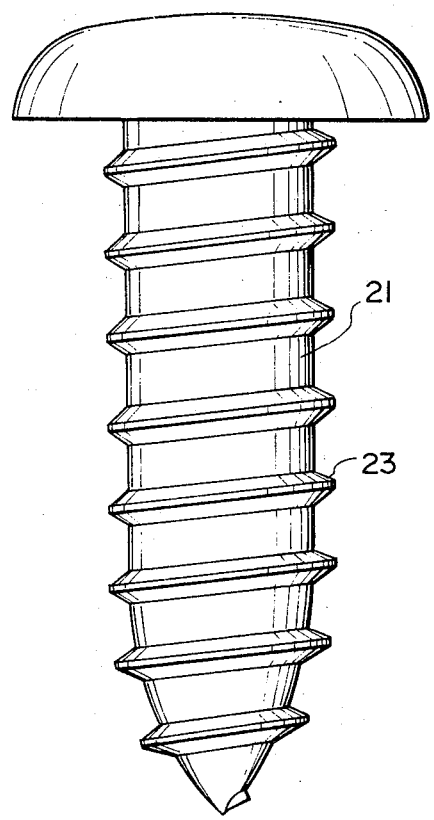
FIG. 5 is a front view of a conventional tapping screw.
Figure 4:
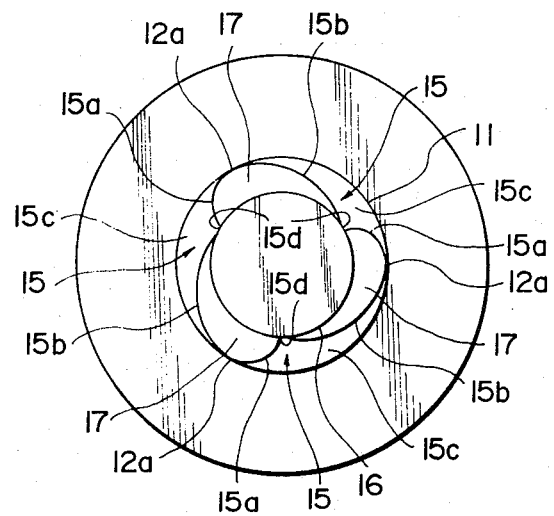
FIG. 4 is a bottom view of FIG. 3.

The tapping screw having the abovementioned construction can be produced in the following manner. Firstly, a screw blank having the rounded triangular cross section in the recuced diameter shank portion which is continuous with the main shank portion having the head and a uniform diameter from base end to the fore end, is headed in a customary manner. Thereafter, threads having the same pitch are then formed from the reduced diameter shank portion to the main shank portion by a rolling die. In producing the tapping screw of the embodiment shown in FIG. 1 and in which a small recess 5 is defined at the base end portion of the reduced diameter shank portion 2 having a substantially rounded triangle shaped cross-section between the apexes 2a and 2a and in which the recess 5 has a groove whose face 5a in the screwing direction is steeper than the face 5b on the opposite side, the following method shown in FIGS. 3 and 4 is to be employed. In heading the screw blank, three recesses 15, each consisting of a tapered surface 15c smoothly continuing from the main shank portion 11 and large and small concave arcuate surfaces 15b, 15a extending from the apexes 12a, 12a to the groove 15d, are firstly formed in the fore end of the uniform diameter main shank portion 1 and a tapered surface 17 extending toward a reduced diameter portion 16 for guiding is formed at the tip. The portion of the screw blank from the main shank portion 11 to the tip is then rolled using a rolling die whereby the threads 4 are formed on the uniform diameter main shank portion 1, the tip portion is simultaneously deformed into the reduced diameter shank portion 2 having a substantially rounded triangular cross-section, and at the same time the threads 3 having the same pitch as that of threads 4 are formed on this reduced diameter shank portion 2. The three small recesses 5 having the abovementioned specific shape are also left on the base of the reduced diameter shank portion 2. The screw may then be treated such as cementation hardening, temperating, plating and the like in a customary manner, thereby mass producing products having homogeneous quality at a low cost of production.

Thus, the present invention provides a tapping screw which eliminates the problems of the conventional tapping screws of this kind and which can be mass-produced at a low production cost by heading and then rolling the screw blank to form the threads in the same way as the conventional production method for screws.

What is claimed is:

1. A tapping screw comprising:
   a main shank portion of a substantially uniform diameter and including a base end and a fore end;
   a reduced diameter shank portion extending from the fore end of the main shank portion and including a base end and a tip end;
   threads of a uniform pitch formed in both said main shank portion and said reduced diameter shank portion;
   said reduced diameter shank portion having a substantially rounded triangular shaped cross-section defining apexes;
   small recesses being formed between the apexes of said rounded triangle;
   each of said small recesses being formed by a steep face facing the screwing direction and a gentle face oppositely facing the steep face;
   each of said small recesses extending only in a region near the base end of the reduced diameter shank portion; and
   a circumferential width of each recess being gradually increased toward said base end of the reduced diameter shank portion.

2. A tapping screw according to claim 1, wherein said steep face of each of said small recesses forms a convex surface.

3. A tapping screw according to claim 1, wherein three small recesses are substantially equally spaced around the circumference of said base end of the reduced diameter shank portion.

* * * * *